US008401964B2

(12) United States Patent
Radu et al.

(10) Patent No.: US 8,401,964 B2
(45) Date of Patent: Mar. 19, 2013

(54) APPARATUS, METHOD, AND COMPUTER PROGRAM PRODUCT FOR ENCODING ENHANCED ISSUER INFORMATION IN A CARD

(75) Inventors: Cristian Radu, Beauvechain (BE); Patrick Mestré, Namur (BE); Duncan Garrett, London (GB)

(73) Assignee: Mastercard International Incorporated, Purchase, NY (US)

( * ) Notice: Subject to any disclaimer, the term of this patent is extended or adjusted under 35 U.S.C. 154(b) by 267 days.

(21) Appl. No.: 12/769,383

(22) Filed: Apr. 28, 2010

(65) Prior Publication Data

US 2010/0325039 A1 Dec. 23, 2010

Related U.S. Application Data

(60) Provisional application No. 61/173,471, filed on Apr. 28, 2009.

(51) Int. Cl.
*G06Q 40/00* (2012.01)
*G06Q 20/00* (2012.01)
*G07D 11/00* (2006.01)
*G06F 19/00* (2011.01)
*G06F 7/00* (2006.01)
*G06K 5/00* (2006.01)

(52) U.S. Cl. ............... 705/39; 705/35; 705/41; 705/65; 705/66; 705/67; 235/379; 235/380; 235/381; 235/382

(58) Field of Classification Search .............. 705/35–44; 235/379–382
See application file for complete search history.

(56) References Cited

U.S. PATENT DOCUMENTS

| 4,825,054 | A | * | 4/1989 | Rust et al. ..................... 235/380 |
| 4,855,578 | A | * | 8/1989 | Hirokawa et al. ............. 235/380 |
| 4,874,935 | A | * | 10/1989 | Younger ....................... 235/492 |
| 5,378,884 | A | * | 1/1995 | Lundstrom et al. ........... 235/441 |
| 5,442,165 | A | * | 8/1995 | Atsumi et al. ................ 235/492 |
| 5,889,941 | A | * | 3/1999 | Tushie et al. .................... 726/26 |
| 6,005,942 | A | * | 12/1999 | Chan et al. .................... 713/187 |
| 6,021,397 | A | * | 2/2000 | Jones et al. ................. 705/36 R |

(Continued)

FOREIGN PATENT DOCUMENTS

WO WO 9852161 A2 * 11/1998
WO WO 2002-054195 7/2002

OTHER PUBLICATIONS

"EMV" downloaded from http://en.wikipedia.org/wiki/EMV on Sep. 22, 2010.

(Continued)

*Primary Examiner* — Gregory Johnson
(74) *Attorney, Agent, or Firm* — Otterstedt, Ellenbogen & Kammer, LLP

(57) ABSTRACT

Facilitating communications between an electronic payment device and an issuer host includes storing in the payment device a set of personalization parameters. A first set of status information indicative of available status information relating to the payment device is transformed into a second set of status information based on the set of personalization parameters, and/or a second set of actions is selected from a first set of actions indicative of available actions to be performed by the payment device based on the set of personalization parameters and an order received from the issuer for initiating at least one corresponding action in the payment device. The second set of status information includes a subset of the first set of status information; the second set of actions includes a subset of the first set of actions. The payment device transmits the second set of status information to the issuer and/or initiates the actions in the second set of actions corresponding to the order received from the issuer.

37 Claims, 7 Drawing Sheets

U.S. PATENT DOCUMENTS

| | | | | |
|---|---|---|---|---|
| 6,101,477 | A * | 8/2000 | Hohle et al. | 705/5 |
| 6,119,945 | A | 9/2000 | Muller | |
| 6,196,459 | B1 * | 3/2001 | Goman et al. | 235/380 |
| 6,199,762 | B1 * | 3/2001 | Hohle | 235/492 |
| 6,273,335 | B1 * | 8/2001 | Sloan | 235/382 |
| 6,298,336 | B1 * | 10/2001 | Davis et al. | 705/41 |
| 6,317,832 | B1 * | 11/2001 | Everett et al. | 713/172 |
| 6,367,011 | B1 * | 4/2002 | Lee et al. | 713/172 |
| 6,375,084 | B1 | 4/2002 | Stanford | |
| 6,398,110 | B1 | 6/2002 | Kikuchi | |
| 6,402,028 | B1 * | 6/2002 | Graham et al. | 235/380 |
| 6,402,038 | B1 | 6/2002 | Stanford | |
| 6,490,367 | B1 * | 12/2002 | Carlsson et al. | 382/137 |
| 6,549,912 | B1 * | 4/2003 | Chen | 1/1 |
| 6,588,673 | B1 * | 7/2003 | Chan et al. | 235/492 |
| 6,742,120 | B1 * | 5/2004 | Markakis et al. | 713/184 |
| 6,761,319 | B2 * | 7/2004 | Peachman et al. | 235/492 |
| 6,880,084 | B1 * | 4/2005 | Brittenham et al. | 713/173 |
| 6,902,107 | B2 * | 6/2005 | Shay et al. | 235/381 |
| 7,287,695 | B2 | 10/2007 | Wankmueller | |
| 7,657,486 | B2 | 2/2010 | Smets | |
| 8,152,074 | B1 * | 4/2012 | de Jong | 235/492 |
| 8,225,386 | B1 * | 7/2012 | de Jong | 726/9 |
| 2001/0018660 | A1 | 8/2001 | Sehr | |
| 2001/0027441 | A1 | 10/2001 | Wankmueller | |
| 2001/0042785 | A1 * | 11/2001 | Walker et al. | 235/379 |
| 2002/0040936 | A1 * | 4/2002 | Wentker et al. | 235/492 |
| 2002/0112156 | A1 * | 8/2002 | Gien et al. | 713/156 |
| 2002/0117542 | A1 * | 8/2002 | Hamann et al. | 235/380 |
| 2002/0147907 | A1 | 10/2002 | Ross | |
| 2003/0097344 | A1 * | 5/2003 | Chaum et al. | 705/75 |
| 2003/0111528 | A1 * | 6/2003 | Sato et al. | 235/380 |
| 2003/0172090 | A1 * | 9/2003 | Asunmaa et al. | 707/200 |
| 2003/0177353 | A1 * | 9/2003 | Hiltgen | 713/161 |
| 2003/0236748 | A1 | 12/2003 | Gressel | |
| 2004/0117302 | A1 * | 6/2004 | Weichert et al. | 705/40 |
| 2004/0139021 | A1 * | 7/2004 | Reed et al. | 705/50 |
| 2004/0164142 | A1 * | 8/2004 | Flugge et al. | 235/380 |
| 2004/0230535 | A1 | 11/2004 | Binder | |
| 2004/0236680 | A1 * | 11/2004 | Luoffo et al. | 705/39 |
| 2004/0236819 | A1 * | 11/2004 | Anati et al. | 709/200 |
| 2004/0238624 | A1 | 12/2004 | Nakano | |
| 2004/0250066 | A1 * | 12/2004 | Di Luoffo et al. | 713/168 |
| 2004/0256451 | A1 * | 12/2004 | Goman et al. | 235/380 |
| 2005/0033688 | A1 * | 2/2005 | Peart et al. | 705/39 |
| 2005/0119978 | A1 * | 6/2005 | Ates | 705/67 |
| 2006/0049258 | A1 | 3/2006 | Piikivi | |
| 2006/0165060 | A1 * | 7/2006 | Dua | 370/352 |
| 2006/0196931 | A1 * | 9/2006 | Holtmanns et al. | 235/380 |
| 2006/0287964 | A1 * | 12/2006 | Brown | 705/64 |
| 2007/0012763 | A1 | 1/2007 | Van de Velde | |
| 2007/0118474 | A1 * | 5/2007 | Tushie et al. | 705/41 |
| 2007/0168260 | A1 | 7/2007 | Cunescu | |
| 2007/0215697 | A1 | 9/2007 | Ward | |
| 2007/0228158 | A1 * | 10/2007 | Brown et al. | 235/380 |
| 2007/0250925 | A1 * | 10/2007 | Levy et al. | 726/20 |
| 2008/0005559 | A1 * | 1/2008 | Johnson | 713/159 |
| 2008/0005567 | A1 * | 1/2008 | Johnson | 713/172 |
| 2008/0010191 | A1 * | 1/2008 | Rackley, III et al. | 705/39 |
| 2008/0082452 | A1 | 4/2008 | Wankmueller | |
| 2008/0126398 | A1 * | 5/2008 | Cimino | 707/102 |
| 2008/0179403 | A1 | 7/2008 | Endlebardt | |
| 2008/0201264 | A1 * | 8/2008 | Brown et al. | 705/67 |
| 2008/0251580 | A1 | 10/2008 | Van de Velde | |
| 2008/0301056 | A1 | 12/2008 | Weller | |
| 2009/0013190 | A1 * | 1/2009 | Benhammou et al. | 713/185 |
| 2009/0063333 | A1 * | 3/2009 | Nambiar et al. | 705/39 |
| 2009/0103730 | A1 | 4/2009 | Ward | |
| 2009/0144197 | A1 * | 6/2009 | Hurry | 705/41 |
| 2009/0164381 | A1 * | 6/2009 | Brown | 705/65 |
| 2009/0255988 | A1 * | 10/2009 | Di Luoffo et al. | 235/380 |
| 2009/0289106 | A1 * | 11/2009 | Bishop et al. | 235/379 |
| 2009/0289112 | A1 * | 11/2009 | Bonalle et al. | 235/380 |
| 2010/0006655 | A1 * | 1/2010 | Phillips | 235/492 |
| 2010/0038424 | A1 * | 2/2010 | Bashan et al. | 235/439 |
| 2010/0044433 | A1 * | 2/2010 | Wankmueller et al. | 235/381 |
| 2010/0094754 | A1 * | 4/2010 | Bertran et al. | 705/44 |
| 2010/0179891 | A1 * | 7/2010 | Maw | 705/30 |
| 2010/0274712 | A1 | 10/2010 | Mestré | |
| 2010/0274722 | A1 | 10/2010 | Roberts | |
| 2011/0022521 | A1 * | 1/2011 | Collinge et al. | 705/67 |
| 2011/0140841 | A1 * | 6/2011 | Bona et al. | 340/5.83 |
| 2012/0011062 | A1 | 1/2012 | Baker | |
| 2012/0011070 | A1 | 1/2012 | Ward | |

OTHER PUBLICATIONS

"ISO 8583" downloaded from http://en.wikipedia.org/wiki/ISO_8583 on Sep. 22, 2010.

"Mobile payment" downloaded from http://en.wikipedia.org/wiki/Mobile_payment#Online_Wallets on Sep. 22, 2010.

EMV Integrated Circuit Card Specifications for Payment Systems Book 1 Application Independent ICC to Terminal Interface Requirements Version 4.2 Jun. 2008.

EMV Integrated Circuit Card Specifications for Payment Systems Book 2 Security and Key Management Version 4.2 Jun. 2008.

EMV Integrated Circuit Card Specifications for Payment Systems Book 3 Application Specification Version 4.2 Jun. 2008.

EMV Integrated Circuit Card Specifications for Payment Systems Book 4 Cardholder, Attendant, and Acquirer Interface Requirements Version 4.2 Jun. 2008.

EMV Integrated Circuit Card Specifications for Payment Systems—Common Payment Application Specification, Version 1.0, Dec. 2005, pp. i-xx & L-33 to L-34.

Corrections to Common Core Definitions, Specification Update Bulletin No. 41, 3rd Edition Nov. 2007, EMVCo.

Support for Transaction Log Files, Specification Update Bulletin No. 19 Second Edition, May 2004, EMVCo.

ISO/IEC9797-1 Information technology-Security techniques-Message Authentication Codes (MACs)-Part 1, downloaded from http://en.wikipedia.org/wiki/ISO/IEC_9797-1 on Mar. 22, 2012.

"Message authentication code" downloaded from http://en.wikipedia.org/wiki/Message_authentication_code.

"Chipo Terms Explained: A Guide to Smart Card Terminology." downloaded from http://www.visa-asia.com/ap/center/merchants/productstech/includes/uploads/CTENov02.pdf.

Bank Zachodni WBK "Top-Up Card" downloaded from http://english.bzwbk.pl/28600.

Bank Zachodni WBK "Premium Top-Up Card" downloaded from http://english.bzwbk.pl/34595.

Bank Zachodni WBK "Pre-Paid Cards" downloaded from http://english.bzwbk.pl/38134.

"Near Field Communication." downloaded from http://en.wikipedia.org/wiki/Near_Field_Communication.

* cited by examiner

400

500

600

APPARATUS, METHOD, AND COMPUTER PROGRAM PRODUCT FOR ENCODING ENHANCED ISSUER INFORMATION IN A CARD

CROSS-REFERENCE TO RELATED APPLICATIONS

This patent application claims the benefit of U.S. Provisional Patent Application Ser. No. 61/173,471 filed on Apr. 28, 2009 and entitled "M/Chip 4 Release 2 (Payment Card Application) (A&B)." The complete disclosure of the aforementioned Provisional Patent Application Ser. No. 61/173,471 is expressly incorporated herein by reference in its entirety for all purposes.

FIELD OF THE INVENTION

The present invention relates generally to the electronic and computer arts, and, more particularly, to apparatus and methods for electronic payment.

BACKGROUND OF THE INVENTION

Devices, such as electronic devices, and particularly electronic payment devices (for example, so-called "smart cards") may be useful for a variety of payment and other applications. Some payment products, such as those referred to as pre-authorized or offline-prepaid, rely on a balance managed by the card. The balance indicates the funds available on the card and is decreased by the transaction amount when a transaction takes place. For customer convenience, the terminal may display this balance before and after the card is debited.

In some types of infrastructure, the card is debited using a command issued by the terminal. The command data typically contains the transaction amount, while the corresponding response from the card confirms (and authenticates) that the card was debited and provides the necessary information for the clearing of the transaction.

A payment transaction often involves online authorization from the card issuer. In this case an authorization request containing transaction data and data from the payment device is sent to the issuer for authorization and a response to this request indicating the approval or decline of the transaction is sent from the issuer to the terminal which then sends the relevant issuer response data to the payment device. Typically, the bandwidth available in the authorization request and response is limited by the network and terminal infrastructure.

SUMMARY OF THE INVENTION

Principles of the invention beneficially provide techniques for encoding enhanced issuer information in a card or other payment device using existing network infrastructure.

In accordance with one embodiment of the invention, facilitating communications between an electronic payment device (e.g., card) and an issuer host includes storing in the payment device a set of personalization parameters. A first set of status information indicative of available status information relating to the payment device is transformed into a second set of status information as a function of the set of personalization parameters, and/or a second set of actions is selected from a first set of actions indicative of available actions to be performed by the payment device as a function of the set of personalization parameters and an order received from the issuer host for initiating at least one corresponding action in the payment device. The second set of status information includes a subset of the first set of status information; the second set of actions includes a subset of the first set of actions. The payment device transmits the second set of status information to the issuer host and/or initiates the actions in the second set of actions corresponding to the order received from the issuer host.

In accordance with another embodiment of the invention, an apparatus for facilitating communications between an electronic payment device and an issuer host includes: means for storing, in the payment device, a set of personalization parameters; means for transforming, as a function of the set of personalization parameters, a first set of status information indicative of available status information relating to the payment device into a second set of status information, the second set of status information comprising a subset of the first set of status information; means for selecting, from a first set of actions indicative of available actions to be performed by the payment device, a second set of actions as a function of the set of personalization parameters and an order received from the issuer host for initiating at least one corresponding action in the payment device, the second set of actions being a subset of the first set of actions; means for transmitting the second set of status information to the issuer host; and means for initiating the actions in the second set of actions corresponding to the order received from the issuer host.

In accordance with yet another embodiment of the invention, an electronic payment device includes memory and at least one processor coupled to the memory. The memory is operative to store status information and a set of personalization parameters relating to the payment device. The processor is operative: (i) to transform, as a function of the set of personalization parameters, a first set of status information indicative of available status information relating to the payment device into a second set of status information, the second set of status information comprising a subset of the first set of status information; (ii) to select, from a first set of actions indicative of available actions to be performed by the payment device, a second set of actions as a function of the set of personalization parameters and an order received from the issuer host for initiating at least one corresponding action in the payment device, the second set of actions being a subset of the first set of actions; (iii) to transmit the second set of status information to the issuer host; and (iv) to initiate the actions in the second set of actions corresponding to the order received from the issuer host.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention provide substantial beneficial technical effects; for example:

allowing an issuer to select the specific card status information (e.g., from a card's internal card verification results (CVR)) it wants to receive, given existing network constraints, and permitting mapping a different status to the same external CVR value and hence the same process;

allowing an issuer to introduce new instructions (e.g., the outcome of processing an authorization response cryptogram (ARPC) response code), more adapted for its card application and the management of its card risk management (CRM) resources, while remaining compatible with existing network infrastructure. The issuer can map a single ARPC response code value to have a different impact on different cards, depending on the configuration setting in each card; and minimizing infrastructure changes or investments and reducing the complexity of issuer host systems when having to manage different types of cards, which is particularly relevant for issuer migration from a smart card application with simple CRM to a platform with more complex CRM.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
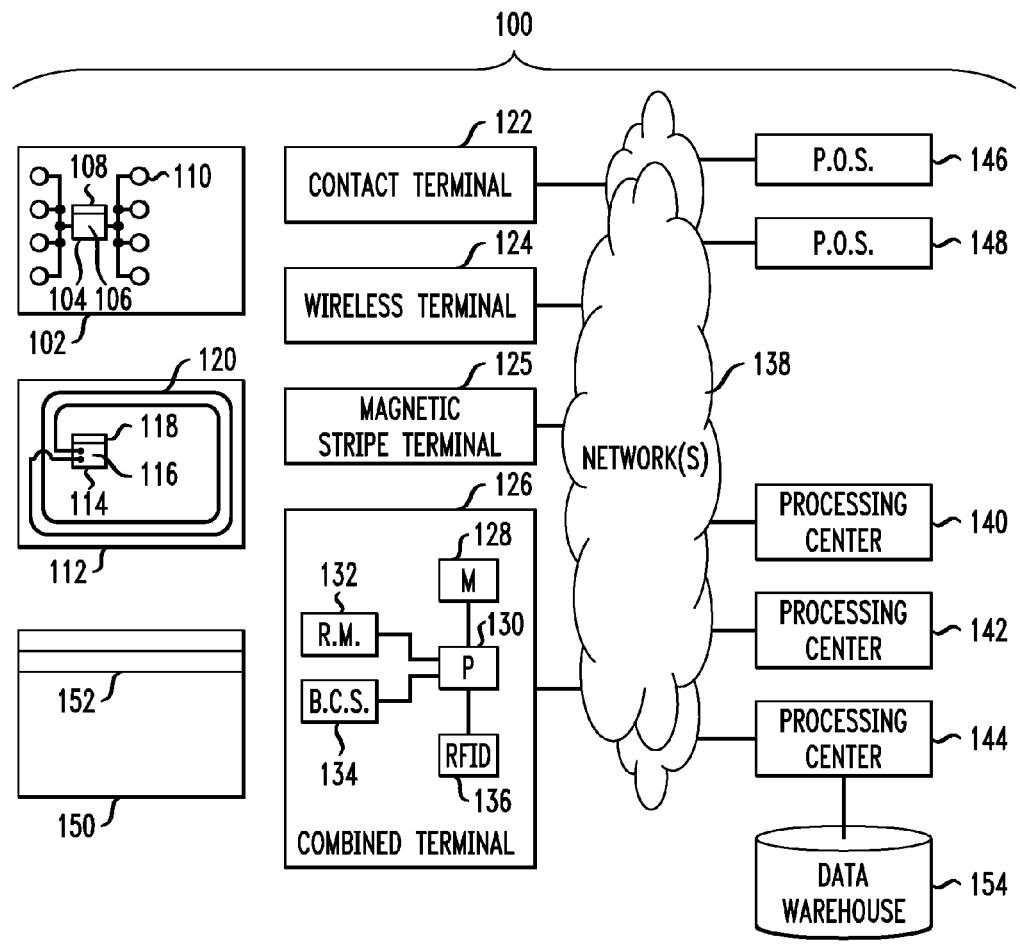
FIG. 1 is a block diagram depicting an exemplary system and various components thereof that can implement techniques of the invention.
Figure 1:
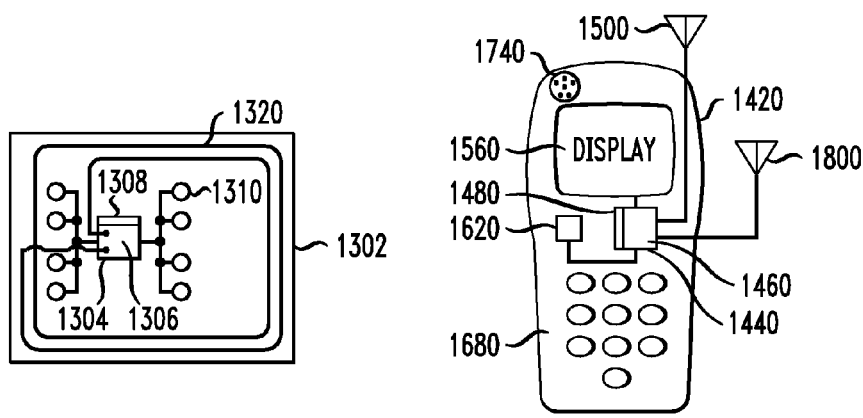

Attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset 1420, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, timing and control functionality necessary to handle communications between memory unit 108, 118 and the input/output ports. The timer can provide a timing reference signal for processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory (e.g., one or more EEPROMs as discussed below). The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement at least a portion of the present invention is the MULTOS® operating system licensed by MAOSCO Limited. (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). The EMV standard defines the interaction, at the physical, electrical, data and application levels, between IC cards and card processing devices for financial transactions (e.g., authenticating credit and debit card payments). The EMV standard, or at least portions thereof, is based primarily on the IC Chip card interface standard set forth in International Organization for Standardization (ISO)/International Electrotechnical Commission (IEC) 7816 (ISO/IEC 7816; "Identification Cards—Integrated Circuit(s) Cards with Contacts," Parts 1-15; 1998-2007, the disclosure of which is incorporated herein by reference in its entirety.). It will be appreciated that applications included in memory portions 108, 118 can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

EMV Integrated Circuit Card Specifications for Payment Systems Book 1 Application Independent ICC to Terminal Interface Requirements Version 4.2 Jun. 2008

EMV Integrated Circuit Card Specifications for Payment Systems Book 2 Security and Key Management Version 4.2 Jun. 2008

EMV Integrated Circuit Card Specifications for Payment Systems Book 3 Application Specification Version 4.2 Jun. 2008

EMV Integrated Circuit Card Specifications for Payment Systems Book 4 Cardholder, Attendant, and Acquirer Interface Requirements Version 4.2 Jun. 2008

EMV Integrated Circuit Card Specifications for Payment Systems—Common Payment Application Specification, Version 1.0, December 2005

Corrections to Common Core Definitions, Specification Update Bulletin No. 41, First Edition June 2005, EMVCo As noted, cards 102, 112 are examples of a variety of payment devices that can be employed. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. In some cases, the cards, or other payment devices, can include body portions (e.g., laminated plastic layers of a payment card, case or cabinet of a PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale (POS) 146, 148, can be connected to network 138. Different types of portable payment devices, terminals, and/or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

In one or more versions of the infrastructure, a dual-interface device 1302 is employed. Device 1302 is shown larger than devices 102, 112 for illustrative convenience but can have a similar form factor and may, according to other embodiments, be smaller than devices 102, 112. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

An appropriately configured cellular telephone handset 1420 can also be employed in infrastructure 100. Handset 1420 is depicted in semi-schematic form, and can include one or more IC chips such as chip 1440 including a processing unit 1460 and a memory unit 1480. Wireless communication with a terminal can be provided via antenna 1500 or with a second antenna 1800 similar to above-described antenna 120 (i.e., the handset could have a second antenna for the payment application). Note that antenna 1800 is depicted schematically, but could be, e.g., a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided.

The description of devices, elements, or components 102, 104, 106, 108, 110, 112, 114, 116, 118, 120 throughout this document are equally applicable to the corresponding items in the dual interface card 1302 and cellular telephone handset 1420.

Figure 2:
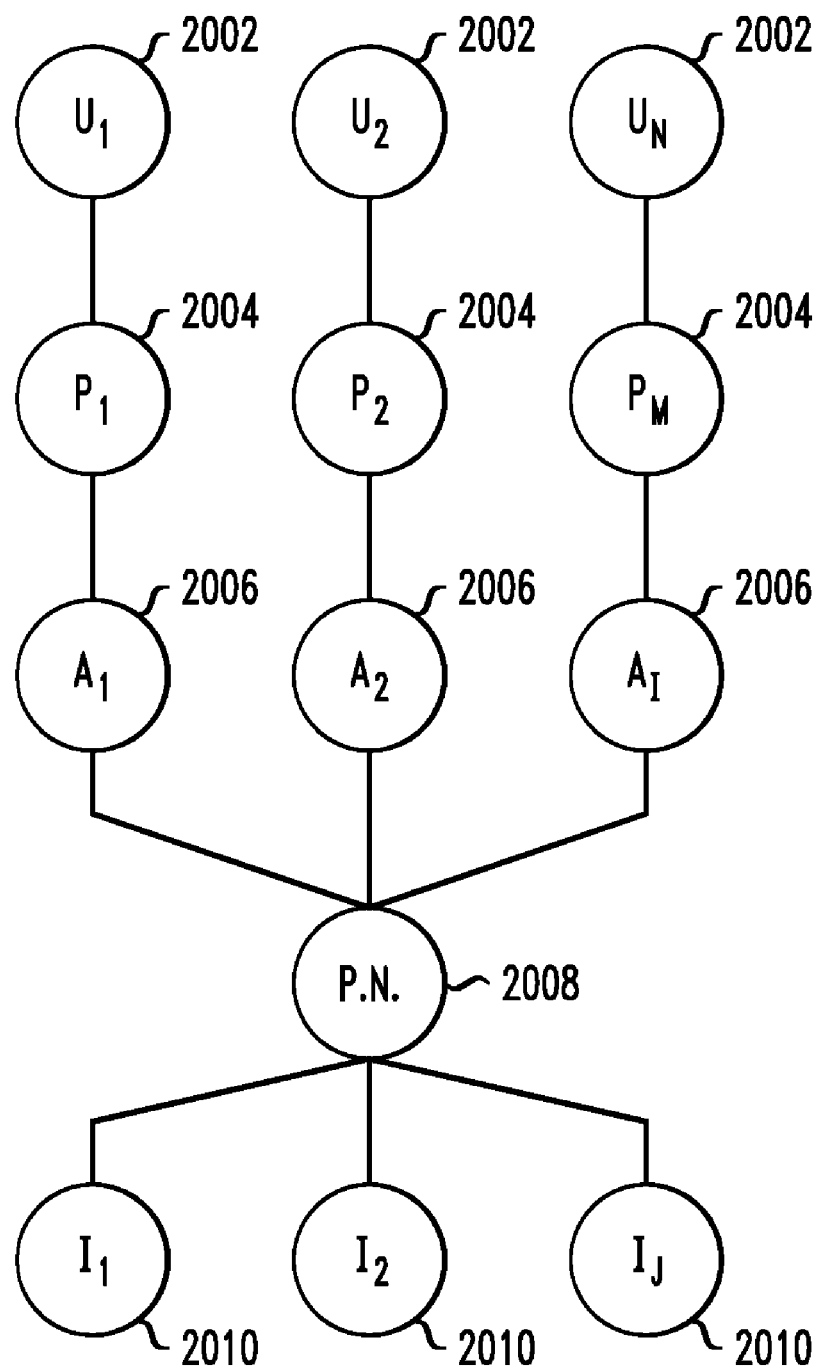
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006 (e.g., batch processing). During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed with other kinds of payment networks, for example, proprietary or closed payments networks with only a single issuer and acquirer, such as the AMERICAN EXPRESS network (mark of American Express Company) (it being appreciated that the latter is a non-limiting example of a proprietary or closed payment network).

Some embodiments may be employed with payment systems such as EMV where some transactions may be authorized offline without the authorization request and response exchange with the issuer and these offline authorized transactions are also stored in "batches" which are later sent for clearing and settlement.

Messages within a network such as network 138 (FIG. 1) and/or network 2008, may, in at least some instances, conform to the ISO Standard 8583, Financial transaction card originated messages—Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

Furthermore, although the skilled artisan will be familiar with same, out of an abundance of caution, the following document is expressly incorporated herein by reference in its entirety for all purposes (published by ISO, Geneva, Switzerland, and available on the ISO web site): ISO/IEC 9797-1 Information technology—Security techniques—Message Authentication Codes—Part 1: Mechanisms using a block cipher As noted, some payment products, such those known as "pre-authorized" or "offline-prepaid," rely on a balance managed by the card. The balance indicates the funds available on the card and is decreased by the transaction amount as a result of the transaction. For customer convenience, the terminal may display this balance before and after the card is debited. Offline financial transactions are becoming more prevalent. Consequently, in order to reduce the added risk to the issuer posed by offline transactions, the card or other payment device, in conjunction with payment applications running on the card, have become increasingly more sophisticated so as to accurately track additional card status information for managing the offline transactions.

Throughout the description of embodiments of the present invention, certain terminology relating to smart card concepts and the like will be used. The definitions prescribed herein to these concepts will generally be consistent with well understood meanings for such terminology.

For example, the term "permanent card data" as used herein is intended to refer broadly to data stored in the card permanent memory. Such permanent card data is distinguishable from temporary data, or other volatile data, which may be used and/or generated, for example, during intermediate processing operations but is generally more transitory in nature, and thus not retained. Permanent data elements may comprise, but are not limited to, data initially personalized on the card or data elements used for tracking a history of card usage between card operations. The permanent data is neither deleted nor altered when the smart card is not in operation and is not powered (e.g., nonvolatile).

The term "online transaction" as used herein is intended to refer broadly to a transaction, or series of related transactions, that is approved or declined by an issuer or its agent. An online transaction generally requires communication between the card and the approving entity. Similarly, an "offline transaction" as used herein is intended to refer broadly to a transaction, or series of related transactions, that is approved or declined by the card without communication with the issuer or its agent. The card approves or declines a transaction "on-behalf" of the issuer.

As previously stated, aspects of the invention beneficially facilitate encoding enhanced issuer information in a card, which is a significant factor for increasing the size of card verification results (CVR) used for complex card risk management (CRM) processing and resources stored in the card. In software code that implements a complex offline CRM functionality that employs multiple resources (e.g., offline counters, accumulators, etc.), the CRM functionality may distinguish between "internal CVR" and "external CVR." Internal CVR preferably includes internal data generated by the card that tracks, in detail, the status of substantially all resources (e.g., CRM resources) used by the software code (e.g., card payment application). The internal CVR is used to decide the offline/online approval or decline of a transaction. External CVR preferably includes information sent to the issuer by the card or other payment device and forms at least a portion of the issuer application data (IAD) which describes the status of the transaction or the card. At least a portion of the information present in the internal CVR is reflected in the external CVR (i.e., the external CVR is generated as a function of the internal CVR).

The term "offline counters" as used herein is intended to refer broadly to internal counters, or other storage registers, maintained in the card and used by the offline CRM of the software code (e.g., payment application executing on the card) to limit the issuer's offline risk. This risk is represented, at least in part, by the amount spent by the cardholder in the offline mode. Since there is no connection to the issuer for offline financial transactions, the software code decides whether or not to accept the transactions offline on the issuer's behalf. The issuer only acknowledges offline transactions when they are cleared. To limit offline risk, offline counters implemented in the card preferably track the number and/or amount of transactions accepted offline, and enable the issuer to make decisions based at least in part on whether or not the counters have reached certain prescribed limits (e.g., upper or lower thresholds).

Throughout the description herein, certain notations may be used. For example: A[j] denotes the j-th element of a vector A; A[1 . . . N] denotes the elements from 1 to N of vector A, where N is a positive integer; A(t) denotes an instance of vector A at time t (when t=0, this is the initial value of the vector); '0b' denotes the binary value "0" of a given bit; '1b' denotes the binary value "1" of a given bit; '010 . . . 1b' denotes a binary value represented by more than one bit; '1C' denotes a hexadecimal value represented by one byte; and a||b denotes a concatenation from left to right of the bit symbols a and b.

Smart card applications typically involve a decision process to approve or decline payment transactions offline or to request online authorization from the card issuer. This decision process is often referred to as offline CRM. The motivation behind an offline approval, offline decline, or online authorization, is captured in the CVR, at least a portion of which is included in the IAD sent to the issuer. These data are desirable to issuers, at least for financial risk assessment, and are therefore incorporated into the online authorization request and the clearing data.

Over time, for enhanced security, risk assessment, or other benefits, the decision process in the card application has become increasingly more complex, involving more counters, more accumulators, more thresholds, etc. Yet, the basic transaction mechanism remains essentially the same. Specifically, by way of illustration only and without loss of generality, an exemplary card application collects the outcome of all its checks and places this information in the CVR. For each check that has failed (e.g., a prescribed threshold has been exceeded) or, alternatively, for each check that matches a predetermined event in a risk management processing action performed by the card, a corresponding bit in the CVR will be set. The CVR is then compared (e.g., bitwise comparison) with card issuer action codes (CIACs), which may comprise configuration settings determined by the issuer. The card application can have multiple CIACs, CIAC-online and CIAC-decline being two prominent CIACs. When the CVR and CIAC-online have one or more bits set in common (for corresponding bit positions), then the transaction will be sent online. When the CVR and CIAC-decline have one or more bits set in common, then the transaction will be declined offline. A CVR may also have an "informational" component that provides other information to the issuer regarding the status of the transaction, indicating that prescribed events have taken place (as opposed to just checks that have failed).

The issuer receives the CVR as part of the IAD in online authorization and/or clearing. When the transaction is sent online, typically at least a portion of the accumulator and counter values are sent online to the issuer as well (e.g., as part of the IAD). In an authorization response cryptogram (ARPC) response code included in the authorization response, the issuer indicates whether the transaction should be approved or declined and whether part or all of the counters and accumulators in the card should be updated. Different types of updates are possible, varying, for example, between setting the accumulator and/or counter values to zero (e.g., resetting operation), keeping the accumulator and/or counter values unchanged, adding the current transaction to the accumulator and/or counter values (e.g., increment operation), or setting the accumulator and/or counter values to a maximum prescribed limit (e.g., initialization operation), as configured in the card application.

With the increased complexity of offline CRM and complexity of terminal interaction, the size of the CVR would ideally increase proportionally with the number of checks that are implemented. Likewise, the ARPC response codes would be extended, with additional values indicative of a corresponding increased number of actions available on the card. Unfortunately, however, existing authorization networks generally have constraints associated therewith for sending IAD and IAhD (e.g., limited bits for data transmission according to standard protocols (like ISO 8583, EMV), limited bandwidth, etc.), and therefore increasing the size of the external CVR or the ARPC response code poses significant problems. For example, the maximum length of the IAD (which typically contains the CVR) and the IAhD (which typically contains the ARPC response code) are, according to the EMV specification, limited to 32 bytes and 16 bytes, respectively. Other protocols impose similar limitations on message length. Additionally, issuers may delegate all or a portion of their processing to third parties or on-behalf services, thereby lacking the flexibility to interpret new CVR values and respond appropriately with additional ARPC response codes.

Principles of the invention advantageously provide a mechanism for enabling an issuer to select the specific card status information (e.g., from the card's internal CVR) it wants to receive, given existing communication protocol and/or network constraints. When network bandwidth, issuer host system processing capability, and/or other factors would otherwise limit the size or contents of the external CVR transmitted to the issuer by the card, the issuer is able to beneficially select a customized subset of status information from the card's internal CVR. Alternately, when enhanced bandwidth capability exists, or issuer host systems are updated over time with additional functionality, issuers can choose to receive an extended portion (or all) of the card's internal CVR (in this case, the subset of status information included in the external CVR would include all of the card's internal CVR). Thus, in accordance with aspects of the invention, an adaptable external CVR is generated as a function of the card's internal CVR and certain selection criteria associated with, or set by, a given issuer.

More particularly, with the increasing usage of offline processing of payment transactions in a modern retail payment business and the corresponding increase in overspending risk by cardholders against which issuers seek protection, the design of corresponding chip card products promotes sophisticated offline CRM systems to control this threat. The CRM keeps accurate track of various types of offline spending and their cumulated value at the expense of using additional resources, including, for example, offline accumulators and offline counters, as previously stated. A comparison between the value of these resources and prescribed lower and upper limits for credit risk sets one or more bits of the internal CVR which, when compared to card issuer action codes (CIACs), triggers certain corresponding actions (e.g., go online if the lower limit is reached on an accumulator).

When online connections are possible, the chip card generates the IAD that transmits to the issuer host a view of the card's CRM resources. This view typically contains a subset of the internal CVR, and is referred to herein as the external CVR. The IAD allows the issuer to take appropriate actions, based at least in part on the external CVR in the IAD, concerning the authorization of the current transaction and reconfiguration of the offline spending possibilities available to the cardholder. Such actions which may be taken by the issuer include, for example, resetting the offline accumulators and counters for cardholders with good credit history, so that they can continue to spend offline, or disabling offline transactions in the case of bad debtors. In this manner, issuers are better able to limit their risk exposure for offline transactions.

While it is desirable to make an enhanced internal CVR available to issuers (e.g., increased number of accumulators/ counters, etc. in the chip card), thereby increasing the size of the internal CVR, it is also desirable that the online interface with the issuer host remain essentially unchanged when communicating a view of the CRM to the issuer host in the IAD. These two conflicting requirements necessitate that a subset of the total information available in the internal CVR (e.g., accumulators/counters, and more specifically their status regarding prescribed limits) be transferred to the issuer in the IAD. Maintaining the format of the IAD and network infrastructure while still providing an issuer with the ability to choose among various actions or other behaviors is thus an important and beneficial aspect of the invention.

Figure 3:
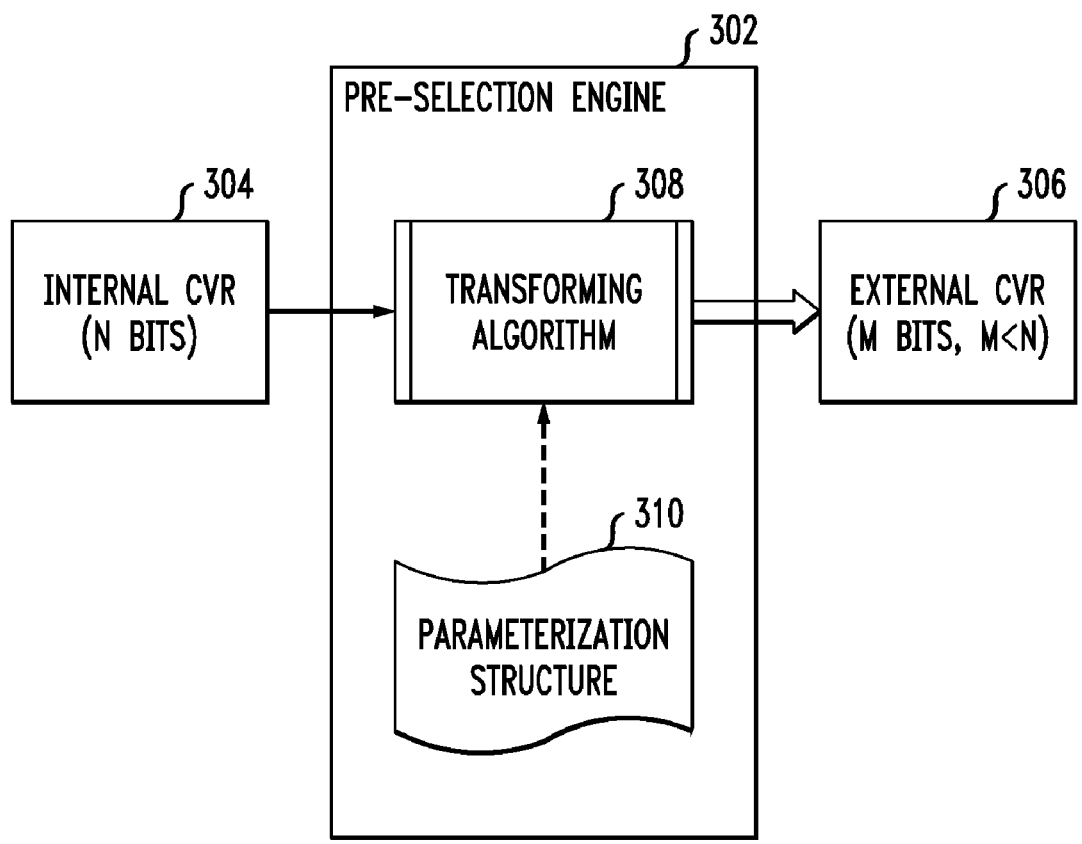
FIG. 3 depicts an exemplary pre-selection system for translating internal card verification results (CVR) to generate an external CVR, according to aspects of the invention.

With reference now to FIG. 3, at least a portion of an exemplary pre-selection system 300 is shown, according to an embodiment of the present invention. System 300 includes a pre-selection engine 302 operative to receive internal CVR 304 or alternative status information of a first length (e.g., N bits) and to generate an external CVR 306 or alternative status information of a second length (e.g., M bits), the second length being, at least in this embodiment, less than the first length (i.e., M<N). The pre-selection engine 302, internal CVR 304 and external CVR 306 are preferably implemented on a card or other payment device. In the embodiment shown, external CVR 306, being smaller in comparison to internal CVR 304 (at least in terms of the number of bits), includes only a subset of the total information available in the internal CVR. In this manner, aspects of the invention facilitate efficient transfer of enhanced status information in a card to an issuer host using existing limited communications infrastructure and resources.

Although external CVR 306 is depicted in the illustrative embodiment of FIG. 3 as being smaller than the corresponding internal CVR 304 (e.g., the external CVR having less bits than the internal CVR), it is contemplated, in accordance with other embodiments of the invention (e.g., wherein the communications infrastructure and/or issuer resources are not limited), that the external CVR may be the same size as the internal CVR or larger (in terms of the number of bits), and therefore has the capacity to include all of the information available in the internal CVR. Moreover, in some embodiments the external CVR 306 may include additional information not found in the internal CVR 304. In embodiments wherein the external CVR is the same size or larger than the internal CVR, the external CVR may still include only a subset of the available status information in the internal CVR (e.g., for providing compatibility with legacy or other issuer hosts), with the additional available bits in the external CVR being used for other functions (e.g., error correction, message re-broadcasting (pass-through), etc.).

In accordance with principles of the invention, for payment cards employing an internal CVR mechanism, pre-selection engine 302 includes a transformation algorithm 308, or alternative process, operative to perform a compression or other translation of the internal CVR 304 for generating the external CVR 306 corresponding thereto. The term "compression" as used herein is intended to refer broadly to any techniques for limiting the data otherwise available for transmission from the card to the issuer. Hence, compression may include simply selecting a subset of the available data in the internal CVR in forming the external CVR having a reduced number of bits. In this instance, an output generated by the transformation algorithm 308 would comprise less card status information than the input internal CVR. Alternatively, the transformation algorithm 308 may be operative to implement a more complex methodology whereby the available input data is encoded using fewer bits. In either scenario, the external CVR 306, being of smaller size than the internal CVR 304, occupies a reduced bandwidth and/or requires less processing resources compared to the internal CVR.

Pre-selection engine 302 further comprises a parameterization structure 310 including a set of personalization parameters preferably defined (customized) by an issuer, for example, during card personalization or at an alternate time (e.g., when performing a configuration upgrade). As will be explained in further detail below, the personalization parameters in parameterization structure 310 may comprise, for example, specific card status information (e.g., CVR) of interest to the issuer. Thus, in essence, parameterization structure 310 comprises a set of one or more rules indicating the manner in which one or more items of card status information are to be conveyed to the issuer. Transformation algorithm 308 is operative to receive, as inputs, the internal CVR 304 and parameterization structure 310 and to generate, as an output, the external CVR 306 as a function thereof.

One illustrative parameterization structure 310 may comprise, for example, 2*M bytes, for N≦2048, where M is an integer indicative of the number of bits in the external CVR 306 and N is an integer indicative of the number of bits in the internal CVR 304. Each distinct pair of bytes, or alternative ordered set of data (e.g., tuple), in the parameterization structure 310 is preferably personalized in the chip card to build bit i in the external CVR 306, where i=1, . . . , M. Specifically, a first element (e.g., byte) of a given tuple (e.g., byte pair) i may store an "input byte number," or alternative offset into the internal CVR, for bit i. This first element having a value n essentially functions as an index or pointer to a corresponding offset into the internal CVR and identifies the start of a region of the internal CVR 304 that will be used to build bit i in the corresponding external CVR 306. In the exemplary case depicted in FIG. 4 where the offset into the internal CVR is indexed by bytes, n will be in the range 1≦n≦N/8. A second element (e.g., byte) of the tuple i may store a "mask" for bit i. This second element identifies which of the bits of the internal CVR 304, starting from the offset n, will be considered in the computation of bit i in the external CVR 306. In the exemplary case depicted in FIG. 4 where the "mask" comprises one byte, 8 bits of the internal CVR will be considered in the computation of bit i in the external CVR.

Figure 4:
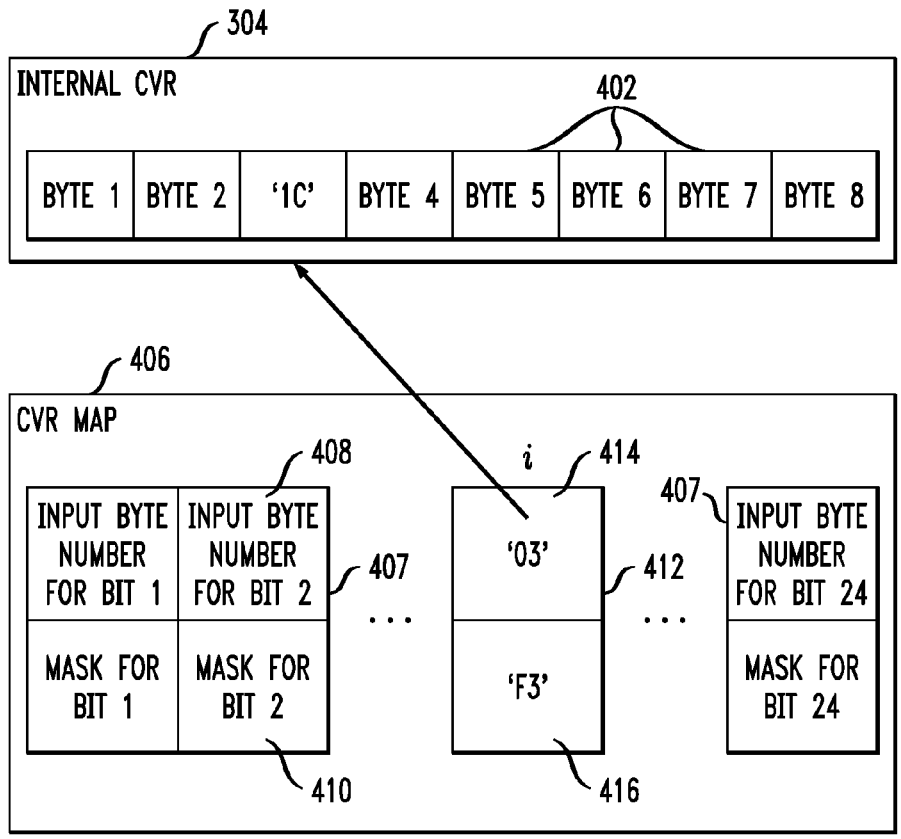
FIG. 4 depicts at least a portion of an exemplary transformation methodology for translating an N-bit internal CVR to an M-bit external CVR which may be used in the illustrative pre-selection methodology shown in FIG. 3, according to aspects of the invention.
Figure 4:
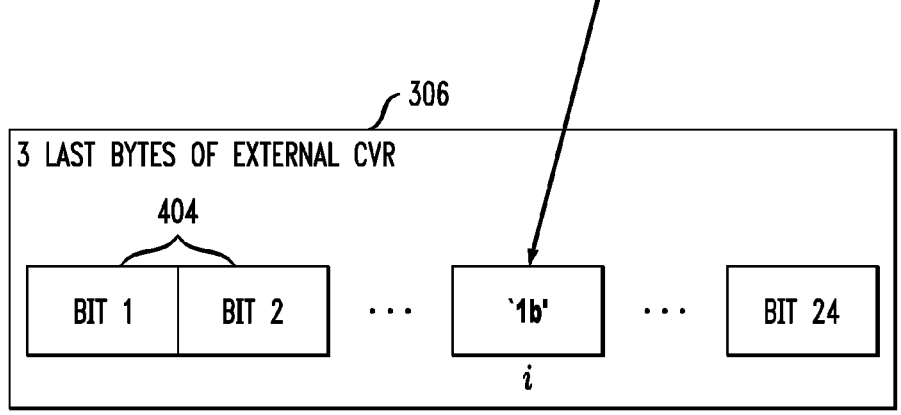

FIG. 4 depicts at least a portion of an exemplary transformation methodology 400 for compressing or otherwise translating an N-bit internal CVR 304 into an M-bit external CVR 306 which may be used in the illustrative pre-selection methodology shown in FIG. 3, according to aspects of the invention. It is to be understood that methodology 400 is shown by way of illustration only and without limitation; other compression methodologies are similarly contemplated, as will become apparent to those skilled in the art given the teachings herein.

Internal CVR 304 includes a plurality of bytes 402, or alternative arrangement of data bits. Although internal CVR 304 is depicted as including eight bytes (bytes 1 through 8), it is to be understood that internal CVR 304 is not limited to any specific number of bytes. External CVR 306 includes a plurality of bits 404; only the last three bytes are shown (bits 1 through 24) for brevity of description. Again, it is to be appreciated that external CVR 306 is not limited to any specific number of bits. A CVR map 406, which may be implemented in parameterization structure 310 shown in FIG. 3, includes a plurality of tuples 407 (e.g., byte pairs), or an alternative ordered set of data, each tuple comprising a first element 408 (e.g., first byte) operative to identify a corresponding offset (e.g., byte number n) into the internal CVR 304, and a second element 410 (e.g., second byte) identifying which of the bits (e.g., of byte n) in the internal CVR 304 will be considered in the computation of bit i in the external CVR 306, as previously explained.

The transformation methodology 400, which is also shown generally in FIG. 3 (as reference numeral 308), computes bit i in external CVR 306, namely, external CVR [i], as a function of internal CVR 304 and corresponding tuple i of the parameterization structure 310 according to the following pseudo code:

```
if (mask byte for bit i AND internal CVR [input byte number for
bit i] ≠ '00') then
    external CVR [i] = '1b'
else
    external CVR [i] = '0b'
```

The above transforming algorithm effectively implements a logical OR function on the values of the selected bits of the specified internal CVR byte, where the corresponding bit in external CVR 306 is set ('1b') if any one of the bits in the comparison result is set.

More particularly, in the example shown in FIG. 4, a selected byte pair 412 in CVR map 406 includes first byte 414 having a value '03' and second byte 416 having a value 'F3.' Byte 414 is operative as a pointer to corresponding byte number 3 in the internal CVR 304, which has the value '1C' associated therewith. The value '1C' corresponding to byte 3 in internal CVR 304 is compared with byte 416, which is operative as a mask to determine which bit positions of byte 3 in internal CVR 304 are of interest for comparison, by performing a logical AND operation, resulting in a byte value of '10.' Since this value is non-zero (indicating that at least one bit position of interest has been set), the corresponding bit i in external CVR 306 is set to '1b' as shown.

In an alternate embodiment, a transforming algorithm that effectively performs a logical AND function can be similarly implemented, where the corresponding bit in external CVR 306 is set only if all (or in other embodiments, multiple) of the bits in the specified internal CVR byte that are selected in the mask byte are set according to the following pseudo code:

```
if (mask byte for bit i AND internal CVR [input byte number for
bit i] == mask byte for bit i) then
    external CVR [i] = '1b'
else
    external CVR [i] = '0b'
```

In some cases, a logical OR transforming algorithm is preferred, such as, for example, in higher risk transactions wherein it is desirable to take action when one or more of a plurality of prescribed conditions has occurred. Alternatively, a logical AND transforming algorithm may be preferred, such as, for example, in lower risk transactions wherein it is desirable to wait to take action until all of a prescribed set of conditions has occurred. A function-selecting bitmap that is M bits long could be used to control which operation (e.g., logical OR or logical AND) is used by the transforming algorithm for specifying each bit in the external CVR 306 as follows:

```
if (function_bitmap [i] = '0b') then
    if (mask for bit i AND internal CVR [input byte number for
    bit i] ≠ '00') then
        external CVR [i] = '1b'
    else
        external CVR [i] = '0b'
else
    if (Mask for bit i AND internal CVR [Input byte number for
    bit i] == Mask for bit i) then
        external CVR [i] = '1b'
    else
        external CVR [i] = '0b'
```

Various other parameterization structures and algorithms suitable for use in the pre-selection engine 302 are contemplated, as will be understood by those skilled in the art given the teachings herein, for example, utilizing an N-bit mask (e.g., applied to the internal CVR 304 as above) for each of the M bits in the external CVR 306.

The pre-selection methodology according to embodiments of the invention beneficially provides an issuer with selective control over the internal card information that is transmitted on the network to describe the status of a given card. This is of particular interest for an issuer who uses different types of cards, as the issuer can parameterize the card to transmit the same data to describe similar statuses, thereby minimizing the changes in the infrastructure that interprets these data. This benefit is further desirable for issuers that migrate from chip cards with less sophisticated offline CRM towards cards with more complex and numerous CRM resources.

At least a portion of the techniques of the invention may be employed to provide a CVR compression or other translation mechanism implemented, for example, in M/Chip® Advance and PayPass®-M/Chip® Flex, registered trademarks of MasterCard International Incorporated, Purchase, N.Y., to facilitate backward compatibility of M/Chip Advance with previous M/Chip products, including, for example, M/Chip 2.1, M/Chip 2.2, M/Chip 2.0.6, and M/Chip 4 v1.1, a family of products offered by MasterCard International Inc. The transformation mechanism is preferably hard-coded in this case and a configuration setting is provided (e.g., tick-box) to select one of the legacy platforms. A limited, and hard-coded, portion of the ARPC response code codebook mechanism is also suitable for implementation in M/Chip Advance, again providing backward compatibility with legacy platforms.

Figure 5:
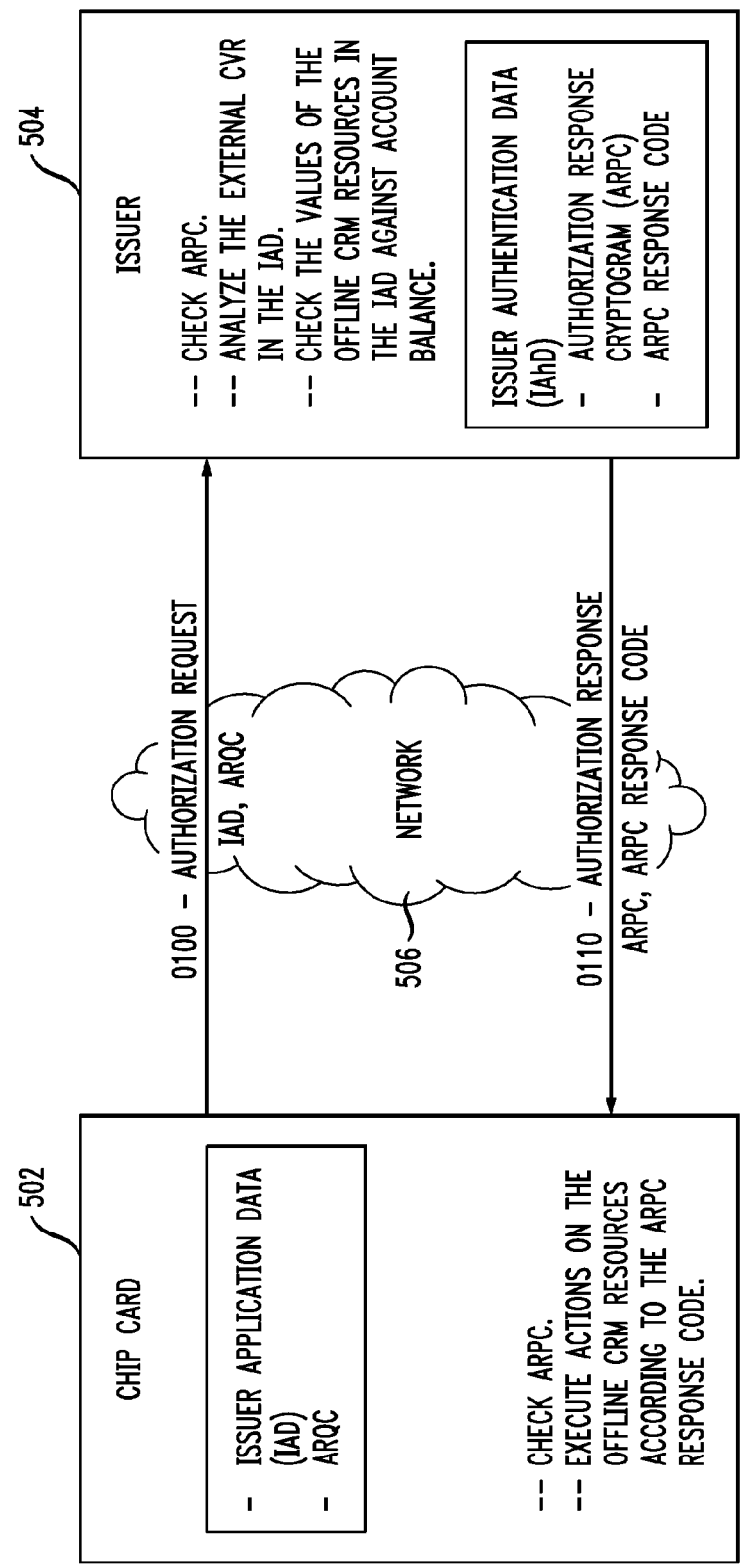
FIG. 5 shows an exemplary issuer application data (IAD)/issuer authentication data (IAhD) methodology for authorizing online transactions and reconfiguring a card risk management (CRM) resource, according to aspects of the invention.

With reference now to FIG. 5, a system 500 implementing an exemplary IAD/IAhD methodology 500 for authorizing online transactions and reconfiguring a CRM resource will be described, according to further aspects of the invention. System 500 includes a chip card 502 in operative communication with an issuer host 504 via a communication network 506, or an alternate connection means. The connection between chip card 502 and issuer 504 may be wired or wireless, depending upon the transaction application used.

Chip card 502 is preferably adapted to perform one or more operations, such as, for example, generating the external CVR, which is incorporated into the IAD and sent to the issuer 504, and generating an authorization request cryptogram (ARQC). In order to perform an online transaction, the chip card 502 generates the ARQC which is unique to each transaction and is supplied by the card to the issuer 504. The chip card 502 is preferably further operative to check the ARPC and ARPC response code received from the issuer host 504 and execute certain actions on the offline CRM resources in response to the ARPC and ARPC response code. Other or different operations may be performed by the card 502, in accordance with embodiments of the invention.

Similarly, the issuer host 504 is preferably adapted to perform one or more operations, such as, for example, receiving the IAD sent by the card 502 and processing the external CVR in the IAD (e.g., checking the values of the offline CRM resources in the IAD against the account balance) and checking the ARQC sent by the card. The issuer 504 is preferably further operative to generate the IAhD, which typically comprises ARPC and ARPC response code (or its equivalent), and to send this information to the card 502 for taking appropriate action thereon. Other or different operations may be performed by the issuer 504, in accordance with embodiments of the invention.

When receiving the IAD during an online connection, the issuer host 504 is informed about the transaction carried out at the point of interaction. The information, which includes the external CVR and the current values of some designated CRM resources (e.g., offline accumulators and counters) residing in the chip card 502, allows the issuer 504 to take the right action(s) concerning authorization of the current transaction and also to determine how to reconfigure the CRM resources to either allow or deny further offline operation of the card.

For example, if the financial status of the cardholder is sound, the issuer 504 may decide to reset the offline accumulators and counters in card 502, so that the cardholder can spend offline at his or her convenience. Otherwise, the issuer 504 can set the offline accumulators and counters to their prescribed upper limits so that no further offline operation of the card 502 is allowed.

The transmission of actions to be performed from the issuer host 504 to the chip card 502 is accomplished through the IAhD, which preferably comprises an appropriate response code (referred to herein as the ARPC response code), indicating the approval or denial of a given transaction and actions to be performed by the chip 502 for reconfiguration of the CRM resources. The IAhD may optionally include a cryptogram (e.g., ARPC), or alternative security means, which is operative to guarantee the authenticity and integrity of the ARPC response code.

As card applications become more complex, the number of accumulators/counters increases in the chip card. Consequently, the number of different potential actions the issuer host must communicate to the chip card in the IAhD-ARPC response code to reconfigure the offline CRM resources increases accordingly (e.g., reset accumulator, but not counter, etc.). At a certain point, the amount of information to be communicated between the issuer and card to convey all of the potentially useful actions on CRM resources exceeds the available space in the IAhD-ARPC response code, the IAhD, and/or the bandwidth of the communication protocol employed (e.g., ISO 8583). Besides, when the issuer migrates from a single application to a more complex application, considering the high cost to modify the issuer software and/or other infrastructure used for online authorization of transactions, it is desirable that the online interface of the issuer host remain substantially unchanged so as to communicate the actions required on the extended CRM resources of the card.

Ideally, the issuer seeks to reuse previous values of the ARPC response codes but still extend the actions in the chip card from a reduced number of accumulators/counters, or other CRM resources, to an extended set of CRM resources.

If backwards compatibility with the host is required, maintaining the format of the IAhD while still allowing an issuer to choose between an extended set of available actions on the CRM resources is desirable. Principles of the invention combine aspect of encoding and pre-selection to enable the issuer to efficiently encode the IAhD-ARPC response code and pre-select a subset of actions among an enhanced number of actions available on the CRM resources.

Figure 6:
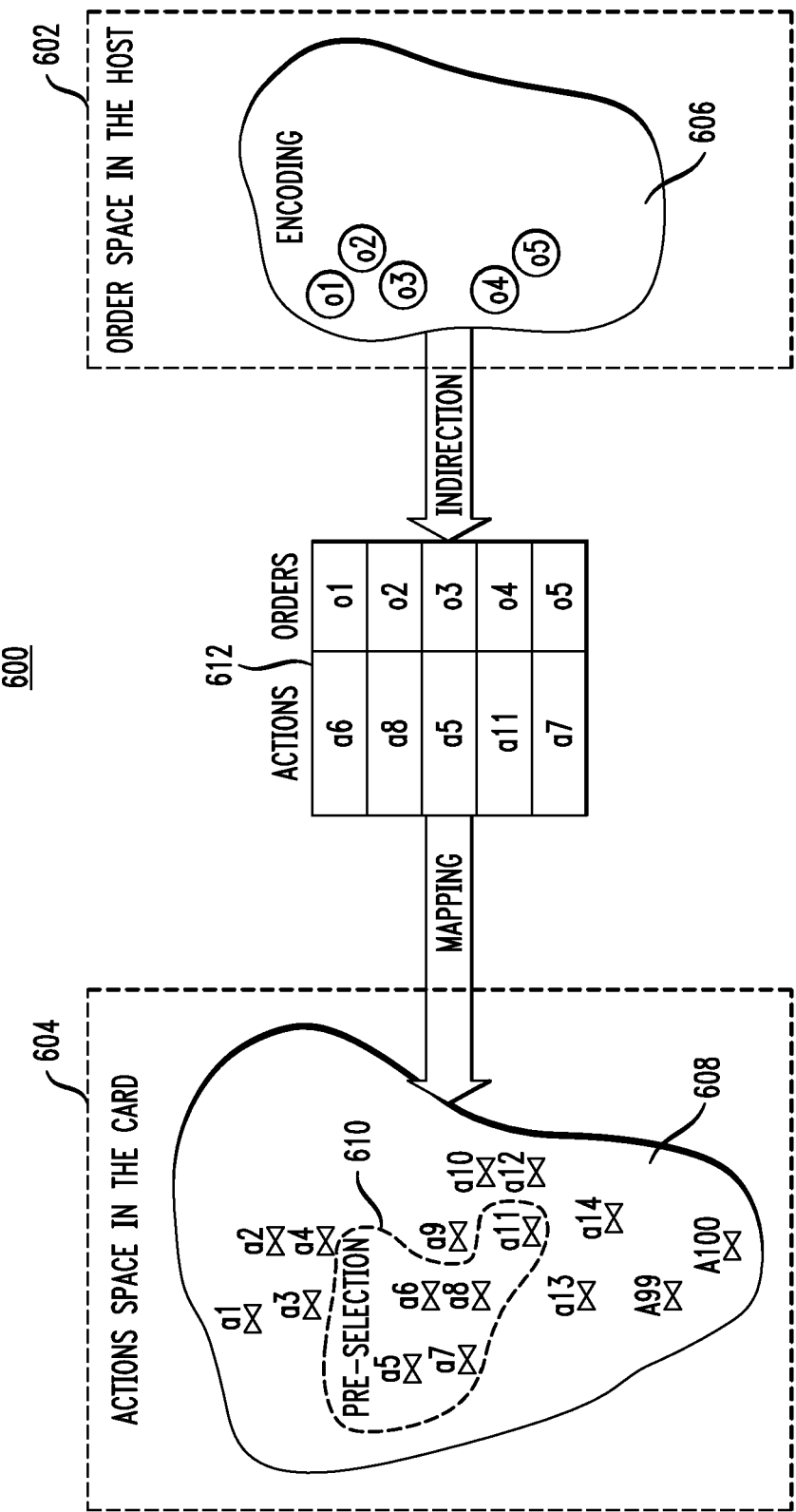
FIG. 6 depicts at least a portion of an exemplary encoding and pre-selection methodology for efficient action communication from an issuer host to a chip card, according to aspects of the invention.

FIG. 6 depicts at least a portion of an exemplary encoding and pre-selection methodology 600 for efficient action communication from an issuer host 602 to a chip card 604, according to aspects of the invention. The issuer host 602 includes an order space 606 comprising one or more orders, o1, o2, o3, o4 and o5. The orders o1 through o5 are preferably commands initiated by issuer 602 and sent to the card 604 for performing explicit actions on the CRM resources in the card. The invention is not limited to the specific number of orders encoded in issuer 602. Likewise, the chip card 604 includes an action space 608 comprising one or more actions, a1, a2, a3, . . . , a99, a100. Actions a1 through a100 in card 604 are preferably explicit events performed by the card on certain CRM resources in the card in response to a corresponding order generated by the issuer 602.

Among the larger action space 608 of different potential actions, the issuer first selects which actions will be used when the card receives a response from the issuer (e.g., when the card is activated for use). To do so, the issuer pre-selects, at card personalization or an alternative time, a subset 610 of available actions in the card. As depicted in FIG. 6, actions a5, a6, a7, a8 and all are included in subset 610. The invention is not limited to any specific number or combination of actions included in subset 610. To each pre-selected action, the issuer assigns a corresponding value of the ARPC response code or a portion of the ARPC response code, represented by orders o1 through o5. Although in this example each order has a single action associated therewith, it is to be understood that a given order may correspond to more than one action, and vice versa.

The card application is personalized with a table 612 comprising pre-selected actions and their assigned ARPC response codes (i.e., orders). The pre-selected actions in table 612 represent specific actions of interest to the issuer 602 to be performed by the card in response to corresponding orders (e.g., commands) sent to the card 604 by the issuer. Table 612 is preferably personalized by the issuer 602 and acts as a parameterization structure for the order-to-action mapping process in a manner similar to parameterization structure 310 shown in FIG. 3. It is to be appreciated that both table 612 and parameterization structure 310 may reside in the personalization parameters of a payment device (e.g., card), such as, for example, in a memory of the payment device.

Table 612, which may comprise a look-up table, can be implemented using an indexed array or alternate data structure. The pre-selection table could be implemented as a decision tree based on the value of individual bits in the ARPC response code. A look-up table can be implemented as a linked list, a hash table, tree, etc., as will be understood by those skilled in the art. See, e.g., table 1 below illustrating an exemplary assignment table, whereby an order oi is mapped to one or more card internal actions aj, where i=1, . . . , N, and j=1, . . . , M.

TABLE 1

| Order | Card Internal Actions |
|---|---|
| o1 | a1, a5 |
| . . . | . . . |
| oi | aj, ak, al |
| . . . | . . . |
| oN | aM |

The issuer transmits to the card, in the IAhD, an ARPC response code. The ARPC response code or a pre-defined subset of the ARPC response code (e.g. the ARPC response code after it has been masked by a logical AND with a personalized or hard-coded mask bitmap) is then used by the card as a pointer or index to a corresponding action (or actions or set of indices to actions) to be performed. The assignment of actions to a given order is essentially unlimited. Moreover, the action(s) to be performed in response to a given order can be easily controlled (customized) by the issuer host simply by selectively reconfiguring table 612 stored in the card to generate a different mapping assignment.

By way of example only and without loss of generality, table 612 in FIG. 6 includes a specific mapping. When a first ARPC response code indicative of order o1 is sent to the card, the card software then finds in table 612, using the ARPC response code as a look up index, the explicit action(s) a6 on the CRM resources to be performed. When a second ARPC response code indicative of order o2 is sent to the card, the card application finds in table 612, using the ARPC response code as a look up index, the explicit action(s) a8 on the CRM resources to be performed. Likewise, a third ARPC response code indicative of order o3 will cause the card application to perform action(s) a5 on the CRM resources; a fourth ARPC response code indicative of order o4 will cause the card application to perform action(s) all on the CRM resources; and a fifth ARPC response code indicative of order o5 will cause the card application to perform action(s) a7 on the CRM resources.

The actions performed on accumulators and counters in the card may have the following exemplary format, in the illustrative case in which the CRM comprises four pairs (e.g., accumulator and counter) of CRM resources, as depicted in tables 2 and 3 below. Table 2 shows exemplary actions performed on the accumulators in the card, and Table 3 shows exemplary actions performed on the counters in the card. For economy of description, actions for only one accumulator and one counter are shown, although it is to be appreciated that similar bit assignments will apply to the remaining accumulators and counters. If all possible combinations of the listed actions were shown, each table would include 256 entries.

TABLE 2

| B8 | B7 | B6 | B5 | B4 | B3 | B2 | B1 | meaning |
|---|---|---|---|---|---|---|---|---|
| x | x | | | | | | | Update accumulator 1 |
| 0 | 0 | | | | | | | Do not update accumulator |
| 1 | 0 | | | | | | | Reset accumulator to zero |
| 0 | 1 | | | | | | | Set accumulator to upper offline limits |
| 1 | 1 | | | | | | | Add transaction to accumulator |
| | | x | x | | | | | Update accumulator 2 |
| | | | | x | x | | | Update accumulator 3 |
| | | | | | | x | x | Update accumulator 4 |

TABLE 3

| B8 | B7 | B6 | B5 | B4 | B3 | B2 | B1 | meaning |
|----|----|----|----|----|----|----|----|---------|
| x | x |   |   |   |   |   |   | Update counter 1 |
| 0 | 0 |   |   |   |   |   |   | Do not update counter |
| 1 | 0 |   |   |   |   |   |   | Reset counter to zero |
| 0 | 1 |   |   |   |   |   |   | Set counter to upper offline limits |
| 1 | 1 |   |   |   |   |   |   | Add transaction to counter |
|   |   | x | x |   |   |   |   | Update counter 2 |
|   |   |   |   | x | x |   |   | Update counter 3 |
|   |   |   |   |   |   | x | x | Update counter 4 |

With reference to tables 2 and 3 above, two bytes are needed for an issuer to send directly to the card the actions in the exemplary ARPC response code (e.g., one byte for accumulator actions and one byte for counter actions). In current MasterCard M/Chip applications (e.g., M/Chip4), two bytes are used to convey ARPC response codes, although all bits may not be available (since several bits will already be dedicated for other ARPC response code functions, such as transaction approval control, etc.). For example, in certain M/Chip applications, bits 1 to 4 of the first byte are already used for a personal identification number (PIN) "try counter." In the second byte, bit 5 is used for approve/decline status, bit 4 is used for an update PIN try counter flag, and bit 3 is used to set or reset a "go online next transaction" flag. The remaining nine bits are reserved for future use.

However, it is likely that the issuer will not use all the potential values of actions, but only a subset thereof. Therefore, during card personalization or at other times (as may be determined by the issuer), the issuer preferably pre-selects a subset (e.g., 8 different actions) of the total actions available in the card and assigns an ARPC response code value to each pre-selected action, according to techniques of the invention. Using this pre-selection approach, eight different values of the ARPC response code are sufficient to trigger the different actions most commonly used (and there is room in the ARPC response code for eight different values, compared to the $2^{16}$ (65,536) needed if the action were to be directly sent in the ARPC response code). Note, that in this illustrative example, each action (the two byte binary value described in tables 2 and 3) is comprised of several sub-actions (Update, Do not update, Reset, and Set) for each of four accumulators and four counters. As the coding of each action in this example can perform the entire range of actions available on all the accumulators and counters, only one such action is required per ARPC response code.

The above exemplary description is specific to a MasterCard M/Chip application which uses a two-byte ARPC response code in the IAhD. However, one skilled in the art given the teachings herein would readily understand, without undue experimentation, that the same principles could be applied to any EMV-compatible application, or even applications that do not utilize a standard communication protocol (e.g., proprietary protocols and the like). And thus the invention is not limited to any specific transaction infrastructure. For example, the EMV Common Payment Application utilizes a four-byte card status update in the IAhD which, like in the previous example, is restricted in the actions that can be encoded and could therefore equally benefit from techniques of the invention by implementing a translation from the external card status update and the actual actions performed by the application.

There is a large range of other potential actions that could be implemented by an application in response to issuer instructions received in the IAhD. For example, an application could support setting the lower and upper limits of counters/accumulators to predefined values. As the bandwidth available in the IAhD is limited for all EMV-compatible applications, there will be significant benefit in translating, through personalization settings and the like, the external instructions that can be communicated in the IAhD into selected internal actions to be performed by the application.

Aspects of the invention described herein are advantageous in that they beneficially optimize the usage of the limited amount of data that can be returned in the response of an online transaction by the issuer to the card in order to reconfigure the CRM resources of the card. Moreover, principles of the invention allow an issuer using different types of cards that use the inventive mechanism to parameterize cards in a way that one ARPC response code triggers similar (but not necessarily identical) actions within the various cards. This allows the issuer to minimize the complexity of the issuer host systems that must manage different types of cards. One benefit provided by principles of the invention, which is expected to be of major interest for issuers who migrate to cards implementing this mechanism, is that it allows the reuse of the existing issuer host logic related to the ARPC response code production and usage, while allowing operation of cards in the field with extended CRM resources and refined offline risk management.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126, a reader 132, a host, server, and/or processing center 140, 142, 144 (optionally with data warehouse 154) of a merchant, issuer, acquirer, processor, or operator of a network 2008 operating according to a payment system standard (and/or specification), and the like. Firmware might be employed, for example, in connection with payment devices such as cards 102, 112, 1302.

Figure 7:
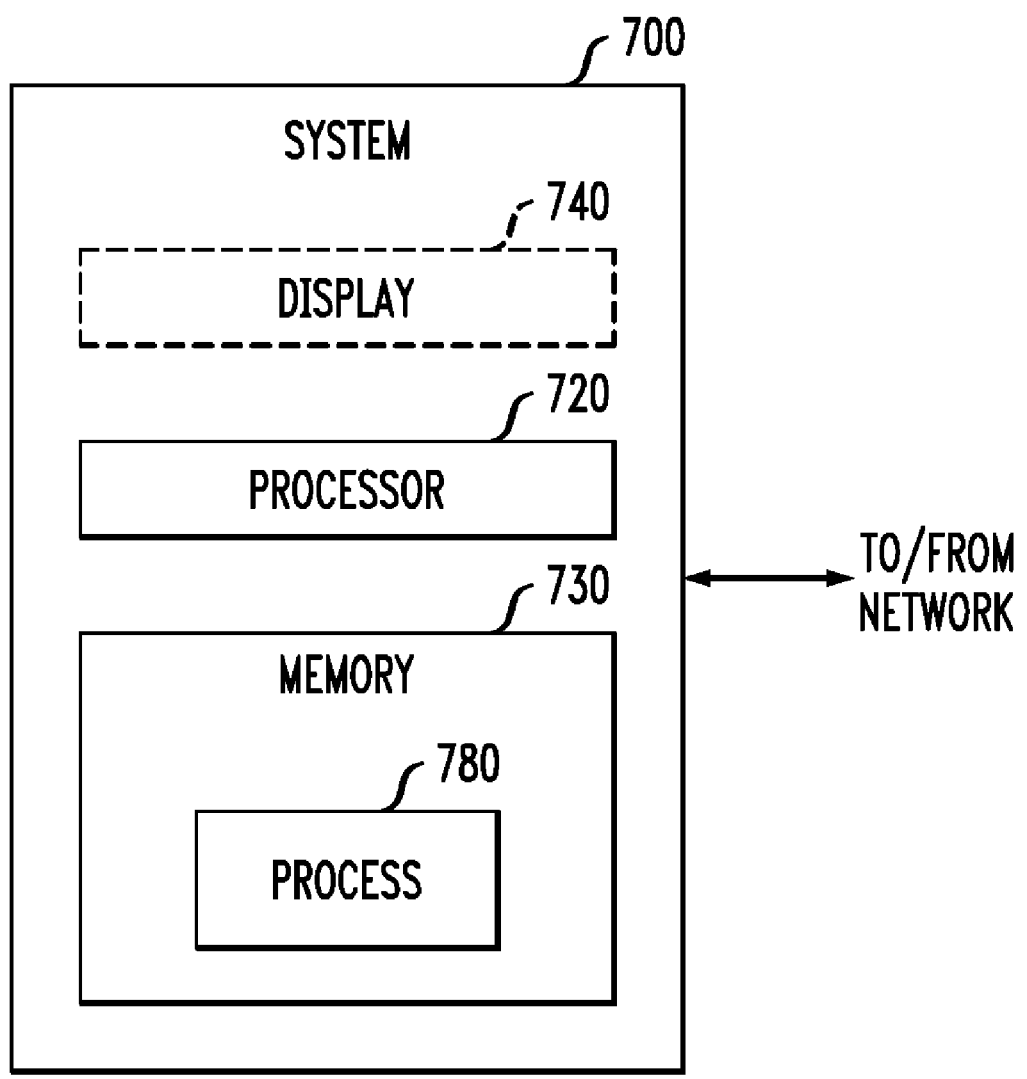
FIG. 7 is a block diagram of at least a portion of an exemplary computer system useful in one or more embodiments of the invention.

FIG. 7 is a block diagram of a system 700 that can implement part or all of one or more aspects or processes of the invention. As shown in FIG. 7, memory 730 configures the processor 720 (which could correspond, e.g., to processor portions 106, 116, 130, 1306, 1460; a processor of a reader 132; processors of remote hosts in centers 140, 142, 144; processors of hosts and/or servers implementing various functionality, and the like) to implement one or more aspects of the methods, steps, and functions disclosed herein (collectively, shown as process 780 in FIG. 7). Different method steps can be performed by different processors. The memory 730 could be distributed or local and the processor 720 could be distributed or singular. The memory 730 could be implemented as an electrical, magnetic or optical memory, or any combination of these or other types of storage devices (including memory portions as described above with respect to cards 102, 112, 1302). It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 122, 124, 126, 140, 142, 144, 130, 132, 2004, 2006, 2008, 2010, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 126, 140, 142, 144, 130, 132, 2004, 2006, 2008, 2010, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 700 as shown in FIG. 7) running a server program. It will be understood that such a physical server may or may not include a display, keyboard, or other input/output components. A "host" includes a physical data processing system (for example, system 700 as shown in FIG. 7) running an appropriate program.

Furthermore, it should be noted that any of the methods described herein can include an additional step of providing a system comprising distinct software modules (in this context, inclusive of firmware as well) embodied on one or more tangible computer readable storage media. All the modules (or any subset thereof) can be on the same medium, or each can be on a different medium, for example. The modules can include any or all of the components shown in the figures. In one or more embodiments, the modules include a payment application module incorporating a CVR translation module and an ARPC response code translation module on the card or other payment device. The payment application module, CVR translation module and ARPC response code translation module can run on one or more hardware processors of a card or other payment device; in general, all modules could run on the same processor, each module could run on a separate processor, and so on. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network (LAN (e.g., LAN 663) and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for facilitating communications between an electronic payment device and an issuer host, the method comprising the steps of:

storing, by the issuer host in the payment device, a set of personalization parameters;

performing at least one of (i) transforming, as a function of the set of personalization parameters, a first set of status information indicative of available status information relating to the payment device into a second set of status information, the second set of status information comprising a subset of the first set of status information, and (ii) selecting, from a first set of actions indicative of available actions to be performed by the payment device, a second set of actions as a function of the set of personalization parameters and an order received from the issuer host for initiating at least one corresponding action in the payment device, the second set of actions being a subset of the first set of actions; and the payment device performing at least one of (i) transmitting the second set of status information to the issuer host, and (ii) initiating all actions in the second set of actions corresponding to the order received from the issuer host.

2. The method of claim 1, wherein the status information relating to the payment device comprises internal data generated by the payment device for tracking a status of risk management resources used by a payment application program executing on the payment device.

3. The method of claim 1, wherein the step of storing the set of personalization parameters comprises generating a mapping including one or more tuples, each of the tuples corresponding to a given bit in the second set of status information, each tuple including a first element identifying a corresponding offset into the first set of status information and a second element identifying which bits of information in the first set of status information to consider in computing a value of a corresponding bit in the second set of status information.

4. The method of claim 3, wherein a value of a given bit in the second set of status information is computed by:
retrieving a first value from an offset into the first set of status information identified by the first element of a selected tuple corresponding to the given bit in the second set of status information;
comparing the first value from the offset into the first set of status information and the second element of the selected tuple; and
for each set bit position in the second element of the selected tuple, setting the given bit in the second set of status information when at least one of the bits in the first value corresponding to set bit positions in the second element of the selected tuple is set.

5. The method of claim 3, wherein a value of a given bit in the second set of status information is computed by:
retrieving a first value from an offset into the first set of status information identified by the first element of a selected tuple corresponding to the given bit in the second set of status information;
comparing the first value from the offset into the first set of status information and the second element of the selected tuple; and
for each set bit position in the second element of the selected tuple, setting the given bit in the second set of status information when all of the bits in the first value corresponding to set bit positions in the second element of the selected tuple are set.

6. The method of claim 1, wherein the set of personalization parameters comprises at least one of: selected status information in the first set of status information that the issuer host is interested in receiving; and one or more actions in the first set of actions that the issuer host is interested in being performed by the payment device in response to corresponding orders initiated by the issuer host.

7. The method of claim 1, wherein the status information relating to the payment device comprises data to be sent from the payment device to the issuer host during at least one of authorization, clearing and settlement of one or more payment transactions associated with the payment device.

8. The method of claim 1, wherein the step of storing the set of personalization parameters comprises generating a mapping including one or more orders associated with the issuer host and one or more selected actions in the first set of actions to be performed by the payment device, each given order in the mapping being assigned by the issuer host to at least a corresponding one of the selected actions in the mapping to be performed by the payment device in response to the given order.

9. The method of claim 8, wherein an authorization response cryptogram (ARPC) response code included in an authorization response sent by the issuer host to the payment device comprises an order in the mapping.

10. The method of claim 8, wherein a given order in the mapping is assigned a plurality of corresponding selected actions to be performed by the payment device in response thereto.

11. The method of claim 8, wherein the mapping comprises a table including a plurality of entries, each entry including at least one of the selected actions in the mapping, each of the orders in the mapping being used as an index to a corresponding entry in the table, the payment device performing the at least one of the selected actions associated with an entry indexed by a corresponding one of the orders.

12. The method of claim 1, wherein for a check that matches a predetermined event in a risk management processing action performed by the payment device, a corresponding bit in the first set of status information is set.

13. The method of claim 1, wherein the first set of actions comprises at least one of updating at least one accumulator in the payment device, updating at least one counter in the payment device, setting at least one accumulator in the payment device to a prescribed value, setting at least one counter in the payment device to a prescribed value, adding a transaction to at least one accumulator in the payment device, adding a transaction to at least one counter in the payment device, setting at least one accumulator in the payment device to a prescribed offline limit, and setting at least one counter in the payment device to a prescribed offline limit.

14. The method of claim 1, wherein the personalization parameters are stored in the payment device by the issuer host when the payment device receives a response from the issuer host.

15. The method of claim 1, wherein the personalization parameters are stored in the payment device by the issuer host during an initialization of the payment device.

16. The method of claim 1, further comprising modifying, by the issuer host, at least one personalization parameter stored in the payment device during a lifecycle of the payment device.

17. The method of claim 1, wherein the first set of status information has a first bit length corresponding thereto, and the second set of status information has a second bit length corresponding thereto, the first bit length being greater than or equal to the second bit length.

18. The method of claim 1, wherein the first set of status information has a first bit length corresponding thereto, and the second set of status information has a second bit length corresponding thereto, the second bit length being greater than or equal to the first bit length.

19. The method of claim 1, further comprising encoding information other than status information relating to the payment device into the second set of information for transmission to the issuer host.

20. An apparatus for facilitating communications between an electronic payment device and an issuer host, the apparatus comprising:
means for storing, in the payment device, a set of personalization parameters defined by an issuer host;
means for performing at least one of (i) transforming, as a function of the set of personalization parameters, a first set of status information indicative of available status information relating to the payment device into a second set of status information, the second set of status information comprising a subset of the first set of status information, and (ii) selecting, from a first set of actions indicative of available actions to be performed by the payment device, a second set of actions as a function of the set of personalization parameters and an order received from the issuer host for initiating at least one corresponding action in the payment device, the second set of actions being a subset of the first set of actions;

means for transmitting the second set of status information to the issuer host; and means for initiating all actions in the second set of actions corresponding to the order received from the issuer host.

21. An electronic payment device, comprising:

memory operative to store status information and a set of personalization parameters defined by an issuer host relating to the payment device; and at least one processor coupled to the memory, the at least one processor being operative: (i) to transform, as a function of the set of personalization parameters, a first set of status information indicative of available status information relating to the payment device into a second set of status information, the second set of status information comprising a subset of the first set of status information; (ii) to select, from a first set of actions indicative of available actions to be performed by the payment device, a second set of actions as a function of the set of personalization parameters and an order received from an issuer host for initiating at least one corresponding action in the payment device, the second set of actions being a subset of the first set of actions; (iii) to transmit the second set of status information to the issuer host; and (iv) to initiate all actions in the second set of actions corresponding to the order received from the issuer host.

22. The device of claim 21, wherein the set of personalization parameters comprises at least one of: selected status information in the first set of status information that the issuer host is interested in receiving; and one or more actions in the first set of actions that the issuer host is interested in being performed by the payment device in response to corresponding orders initiated by the issuer host.

23. The device of claim 21, wherein the at least one processor is further operative to generate a mapping including one or more tuples, each of the tuples corresponding to a given bit in the second set of status information, each tuple including a first element identifying a corresponding offset into the first set of status information and a second element identifying which bits of information in the first set of status information to consider in computing a value of a corresponding bit in the second set of status information.

24. The device of claim 23, wherein a value of a given bit in the second set of status information is computed by the at least one processor by:

retrieving a first value from an offset into the first set of status information identified by the first element of a selected tuple corresponding to the given bit in the second set of status information;

comparing the first value from the offset into the first set of status information and the second element of the selected tuple; and for each set bit position in the second element of the selected tuple, setting the given bit in the second set of status information when at least one of the bits in the first value corresponding to set bit positions in the second element of the selected tuple is set.

25. The device of claim 23, wherein a value of a given bit in the second set of status information is computed by the at least one processor by:

retrieving a first value from an offset into the first set of status information identified by the first element of a selected tuple corresponding to the given bit in the second set of status information;

comparing the first value from the offset into the first set of status information and the second element of the selected tuple; and for each set bit position in the second element of the selected tuple, setting the given bit in the second set of status information when all of the bits in the first value corresponding to set bit positions in the second element of the selected tuple are set.

26. The device of claim 21, wherein the at least one processor is further operative to generate a mapping including one or more orders associated with the issuer host and one or more selected actions in the first set of actions to be performed by the payment device, each given order in the mapping being assigned by the issuer host to at least a corresponding one of the selected actions in the mapping to be performed by the payment device in response to the given order.

27. An article of manufacture for facilitating communications between an electronic payment device and an issuer host, said article of manufacture comprising a machine readable medium containing one or more programs which when executed implement the steps of:

storing, in the payment device, a set of personalization parameters defined by the issuer host;

performing at least one of (i) transforming, as a function of the set of personalization parameters, a first set of status information indicative of available status information relating to the payment device into a second set of status information, the second set of status information comprising a subset of the first set of status information, and (ii) selecting, from a first set of actions indicative of available actions to be performed by the payment device, a second set of actions as a function of the set of personalization parameters and an order received from the issuer host for initiating at least one corresponding action in the payment device, the second set of actions being a subset of the first set of actions; and the payment device performing at least one of (i) transmitting the second set of status information to the issuer host, and (ii) initiating all actions in the second set of actions corresponding to the order received from the issuer host.

28. A system comprising:

An electronic payment device comprising risk management resources, configured for performing a plurality of available actions on the risk management resources, and a parameterization structure including preselected actions representing specific actions among the plurality of available actions of interest, the preselected actions being a subset of the available actions;

a network, and an issuer host configured to communicate with the electronic payment device via the network and generate issuer authentication data (IAhD) including an appropriate response code (ARPC response code), the ARPC response code including one or more orders mapped to one or more of the preselected actions, the parameterization structure being reconfigurable by the issuer host to generate a different mapping assignment such that orders from the issuer host are mapped to different preselected actions.

29. A method comprising:
defining a set of personalization parameters at an issuer host;
storing, in a memory in a payment device, the set of personalization parameters defined by the issuer host, and
translating, an internal set of verification results stored on the payment device and usable for risk management processing into an external set of verification results that the issuer host wishes to receive based on the set of personalization parameters defined by the issuer host, the external set of verification results being a subset of the internal set of verification results.

30. The method of claim 29, further comprising receiving by the issuer host from the payment device issuer application data (IAD) including the external set of verification results.

31. The method of claim 29, further comprising modifying, by the issuer host, at least one personalization parameter stored in the payment device during a lifecycle of the payment device.

32. In a system including an issuer host, a network, and an electronic payment device communicable with the issuer host via the network, a method comprising:
storing, in the electronic payment device, a set of personalization parameters defined by the issuer host;
selecting, from a first set of actions indicative of available actions to be performed by the electronic payment device on risk management resources, a second set of actions as a function of the personalization parameters and an order received from the issuer host for initiating at least one corresponding action in the electronic payment device, the second set of actions being a subset of the first set of actions, and
initiating all actions in the second set of actions corresponding to the order received from the issuer host.

33. The method of claim 32, wherein the step of storing the set of personalization parameters comprises generating a mapping including one or more orders associated with the issuer host and one or more selected actions in the first set of actions to be performed by the electronic payment device, each given order in the mapping being assigned by the issuer host to at least a corresponding one of the selected actions in the mapping to be performed by the electronic payment device in response to the given order.

34. The method of claim 33, wherein an authorization response cryptogram (ARPC) response code included in an authorization response sent by the issuer host to the electronic payment device comprises an order in the mapping.

35. The method of claim 33, wherein a given order in the mapping is assigned a plurality of corresponding selected actions to be performed by the electronic payment device in response thereto.

36. The method of claim 33, wherein the mapping comprises a table including a plurality of entries, each entry including at least one of the selected actions in the mapping, each of the orders in the mapping being used as an index to a corresponding entry in the table, the electronic payment device performing the at least one of the selected actions associated with an entry indexed by a corresponding one of the orders.

37. The method of claim 32, further comprising modifying, by the issuer host, at least one personalization parameter stored in the electronic payment device during a lifecycle of the electronic payment.

* * * * *